United States Patent [19]

Lang

[11] 4,311,357
[45] Jan. 19, 1982

[54] ANNULAR SCANNING LIGHT PULSE SYSTEM

[75] Inventor: Paul W. Lang, Long Beach, Calif.

[73] Assignee: Raymus K. Payton, Newport Beach, Calif.

[21] Appl. No.: 185,144

[22] Filed: Sep. 8, 1980

[51] Int. Cl.³ .............................................. G02B 27/17
[52] U.S. Cl. .................................. 350/6.9; 350/96.24
[58] Field of Search ....................... 350/171, 172, 6.9; 250/227

[56] References Cited

U.S. PATENT DOCUMENTS

| | | | |
|---|---|---|---|
| 3,459,466 | 8/1969 | Giordmaine | 350/356 |
| 3,684,346 | 8/1972 | Lang | 350/96.24 |
| 3,868,167 | 2/1975 | Schreiber | 350/6.9 |
| 3,987,301 | 10/1976 | O'Connor | 250/227 |
| 4,085,322 | 4/1978 | Sick | 250/227 |
| 4,212,516 | 7/1980 | Sawamura | 250/227 |
| 4,222,630 | 9/1980 | Delignieres | 250/227 |

*Primary Examiner*—John K. Corbin
*Assistant Examiner*—Rebecca D. Gass
*Attorney, Agent, or Firm*—Ralph B. Pastoriza

[57] ABSTRACT

A laser beam is scanned in a circular pattern so that it will successively impinge upon light entrance ends of a plurality of optical fibers arranged in a similar circular array. Successive fibers differ in path lengths in such a manner that the light from the scanning laser beam exits substantially simultaneously from the exit ends of the fibers so that a relatively high intensity or amplitude light pulse results.

7 Claims, 2 Drawing Figures

ANNULAR SCANNING LIGHT PULSE SYSTEM

This invention relates generally to optics and more particularly to an annular scanning light pulse system for producing relatively high amplitude output light pulses from either a steady state light or from individual equally time spaced light pulses.

BACKGROUND OF THE INVENTION

U.S. Pat. No. 3,459,466 issued to J. A. Giordmaine on Aug. 5, 1969 describes an optical beam peak power amplifier and buncher.

Essentially, this patent teaches the concept of breaking up a light beam into spatially separated portions and thence subjecting the spatially separated portions to different delay times so that the same can be reassembled to all occur substantially at a single moment in time.

In my U.S. Pat. No. 3,684,346 issued Aug. 15, 1972 there is described an optical integrating system which accomplishes an integration of spatially and time separated light pulses into a single large pulse of light by utilizing a unique arrangement of fiber optics together with a special reflective crystal capable of generating progressively increasing annular rings of light.

In both of the foregoing systems, there is involved a "fly back" time in the scanning of the initial light beam in order to "break up" in a time and spatial sequence the light involved so that successive portions thereof can be delayed in such a manner that they will all add up at the output. For example, if a row of delay lines is provided, the light will successively impinge on the inlet ends of the delay lines until it reaches the last of the delay lines and then the light must be returned to its initial position; that is, scanned back quickly to the first one of the delay lines and the process then repeated.

The same situation obtains in my above-mentioned U.S. patent wherein concentric rings of light are employed in the scanning operation. When the last or largest diameter ring is completed, the generating crystal must return to its initial state to commence a second succession of ever-expanding rings of light and it is during the return time that the light is wasted.

BRIEF DESCRIPTION OF THE PRESENT INVENTION

With the foregoing considerations in mind, the present invention contemplates an improved apparatus for converting light into one or more output pulses of very high amplitude utilizing the principles set forth in the prior mentioned U.S. patents but wherein there is no loss of light during any "fly back" time.

More particularly, the foregoing is achieved by providing means defining a series of light paths having individual light entrance ends and light exit ends, the light entrance ends being arranged in an annular or circular array. The lengths of the paths successively decrease from one path to the next adjacent path until the shortest path is reached which shortest path is immediately followed by the path of greatest length. A means for cyclically sweeping a light beam such as a laser beam in a circular pattern is provided so that the annularly arranged light entrance ends of the paths can be sequentially scanned and in a cyclical or continuous manner over 360°. The time for light to travel the difference between successive path lengths corresponds to the time of scan of the light beam from one light entrance opening or end to the next successive light entrance opening or end so that light passes from the light exit ends of the various light paths substantially simultaneously.

Because of the annular or circular sweep pattern for the light beam, there is not involved any "fly back" time so that maximum use is made of the initial light.

BRIEF DESCRIPTION OF THE DRAWINGS

A better understanding of this invention will be had by now referring to the accompanying drawings in which.

DETAILED DESCRIPTION OF THE INVENTION

Figure 1:
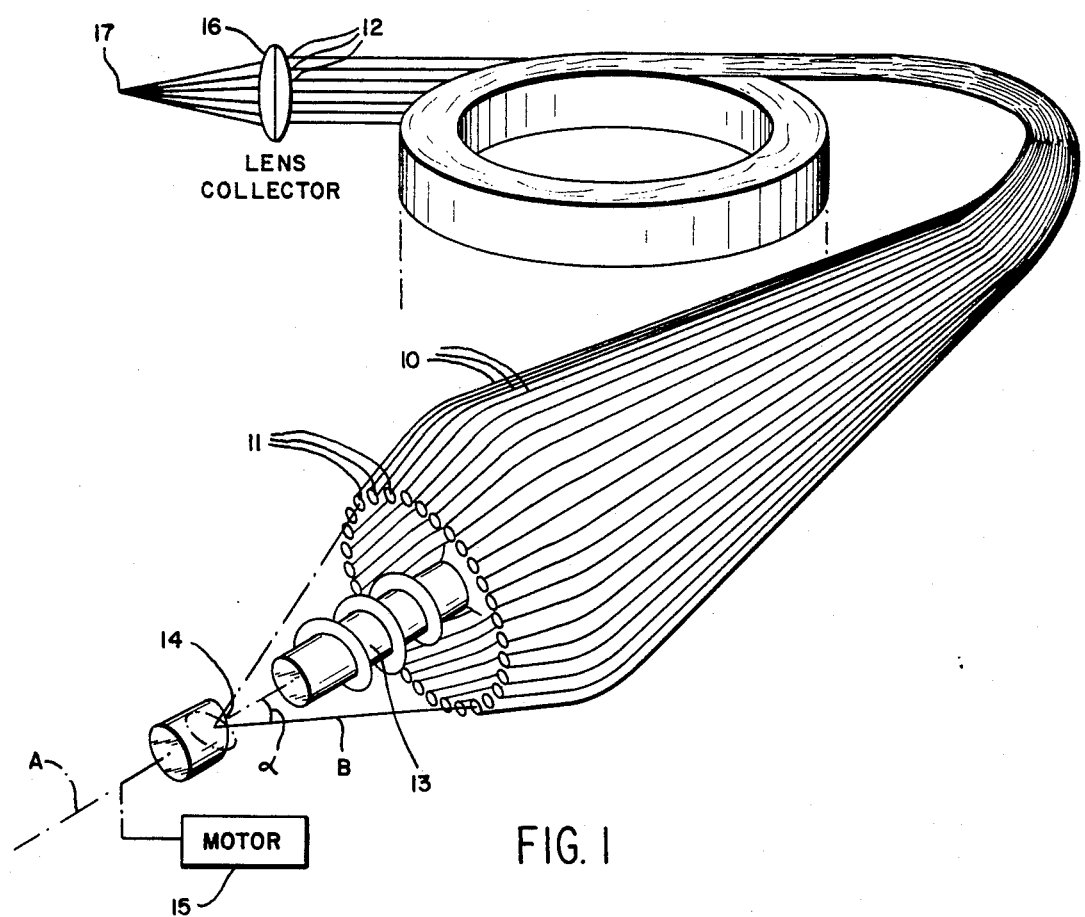
FIG. 1 is a schematic type perspective view of an annular scanning light pulse system in accord with my present invention.

Referring first to FIG. 1, there is shown a plurality of optical fibers 10 having light entrance ends 11 arranged in a circular array as shown. The other ends of the various fibers 10 terminate in light exit ends 12. As will become clearer as the description proceeds, the optical fibers are of lengths between their light entrance and light exit ends successively decreasing in equal steps of a given distance.

A light beam source is shown in the forward portion of FIG. 1 in the form of a laser 13 for generating a highly powerful light beam along its optical axis designated A. A scanning means, in turn, comprises an optical device along the optical axis A, which device in the embodiment of FIG. 1 takes the form of a mirror 14. The mirror 14 serves to redirect the beam of light from the laser 13 at an acute angle to the optical axis A. In FIG. 1, the direction of the beam is designated by the line B and the acute angle to the optical axis A is indicated at $\alpha$.

Appropriate means are provided acting on the optical device 14 to cause the beam B to scan successively the annular array of light entrance ends 11 of the optical fibers 10. In the embodiment illustrated, this action is accomplished by a motor 15 rotating the mirror 14 about the optical axis A, the normal to the mirror surface forming an angle with the optical axis A equal to $\frac{1}{2}$ of $\alpha$.

By utilizing a small mirror of very little mass, the same can be rotated at extremely high speeds such as by appropriate turbine motors or the like. The movement of the end of the light beam B along the light entrance ends of the optical fibers can be made extremely rapid, this movement being amplified because of the mirror arrangement and its distance from the light entrance ends of the optical fibers. For example, if the mirror were rotated at 180,000 rpm and there were provided 100 entrance ends for the optical fibers, the time of scan from one end to the next successive end would be of the order of $0.333 \times 10^{-5}$ sec.

By now making the given distance representing the difference in lengths of successive fibers correspond to the distance light travels in any one of the optical fibers in a time increment equal to the time the beam takes to scan from one of the optical fibers to the next adjacent optical fiber in the annular array, the light will pass from the light exit ends of the fibers substantially simultaneously.

An appropriate collecting lens 16 may be provided to focus the simultaneous presence of light at the exit ends 12 of the various fibers to a focal point 17 wherein a very high intensity amplitude light pulse results.

In the above example, wherein 100 optical fibers are employed and wherein the mirror is rotated at approximately 180,000 rpm, the given distance representing the difference in optical path lengths between successive fibers is of the order of one kilometer. Actually, the distance would be less since the speed of light within the fiber is less than that in empty space. Of course, this distance can be made considerably less if the scanning speed can be increased.

Another means of decreasing the overall distance between the first and last of the fibers is to break up the annular array into arcuate segments and then repeat the operation for each segment. The result is a series of high amplitude pulses each complete 360° scan corresponding in number to the number of segments selected.

Figure 2:
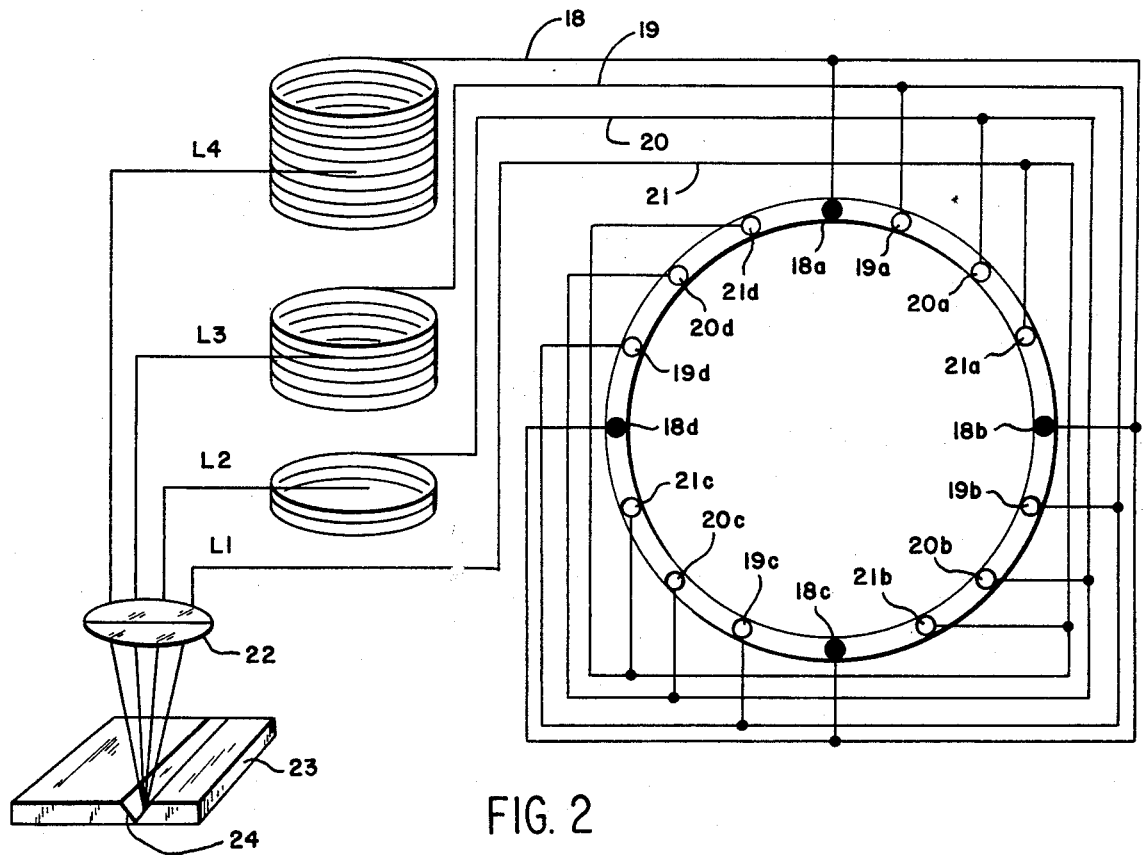
FIG. 2 is a highly schematic diagram useful in explaining one of the embodiments of the apparatus shown in FIG. 1 and its operation.

By way of example of the foregoing, reference is had to the highly schematic showing of FIG. 2 setting forth one example of a segmental system. In FIG. 2, there is shown in full front view an annular or circular array of entrance ends of optical fibers, there being a total of 16 such fibers. These are broken into segments of four each so as to provide a total of four such arcuate segments. Thus, the top fiber as viewed in FIG. 2 is designated 18a, the next successive fiber 19a, the next 20a and the last making up the first segment 21a. The four numbers with the affix "a" make up a first segment. A second segment is made up of the four numbers 18 through 21 followed by the affix "b", the third segment by the same numbers followed by the affix "c" and the fourth segment by the same numbers followed by the affix "d".

In accord with the segmented system, the first optical fiber in each of the segments which would be the optical fibers 18a, 18b, 18c and 18d all connect together to a common optical fiber 18 and are all subject to follow a given path length which is the same for all of these four fibers. This total path length is designated L4 in FIG. 2.

The next successive fibers in each of the four segments designated 19a, 19b, 19c, and 19d all connect together to a common fiber 19 in turn of a path length L3 decreased from the path length L4 by a given distance.

Similarly, the third fiber optic in each of the segments connects to a common line 20 of a path length L2 and the last fiber optic in each segment connects to a common line 21 of a path length L1.

If the difference between the successive path lengths; e.g. L4-L3, L3-L2, etc. is defined by the distance light will travel in one of the optical fibers in a time increment corresponding to the scan time between successive fibers, then there will be provided four bursts of high amplitude light for each 360° rotation of the light beam at the exit ends of the path lengths L4 through L1.

In FIG. 2, another collector 22 in the form of a lens is shown at these exit ends to focus the bursts of light onto a work such as a metal 23 to be cut as at 24.

The use of segments resulting in a number of high amplitude pulses being generated for each of the revolutions of scan of the beam over 360° has distinct advantages. First, the total lengths of the fiber optics involved can be substantially decreased depending upon the number of segments utilized since the same fiber optics can be used on various fibers in the different segments as described in FIG. 2. Second, a very high repetition rate of pulses can be realized by the segment system which can be advantageous in metal cutting operations. The situation is analogous to the rapid rotating saw with very fine teeth.

From all of the foregoing, it will thus be seen that the present invention has provided an improved system for providing high amplitude light pulses without wasting any of the available light energy in the form of "fly back" time.

I claim:

1. An annular scanning light pulse system including, in combination:
    (a) means defining a series of light paths having individual light entrance ends arranged in a circle and light exit ends, the lengths of said paths successively decreasing from one path to the next adjacent path;
    (b) means for cyclically sweeping a light beam in a circular locus to successively impinge on the light entrance ends of the paths, the time for light to travel the difference between successive path lengths corresponding to the time of scan from one light entrance opening to the next successive light entrance opening by said light beam so that light passes from the light exit ends of said paths substantially simultaneously; and
    (c) light collecting and converging means positioned to intercept the light emanating from said exit ends to cause the light to converge to a given focal point so that a high intensity light pulse occurs at said focal point when light emanates from each of said exit ends.

2. An annular scanning light pulse system according to claim 1, including a laser for generating said light beam.

3. An annular scanning light pulse system including, in combination:
    (a) a plurality of optical fibers having light entrance ends arranged in a circular array and defining at least one arcuate segment incorporating a given number of said optical fibers of lengths between their light entrance and light exit ends successively decreasing in equal steps of a given distance;
    (b) a light beam source; and,
    (c) scanning means for directing and moving a light beam from said source in a circular pattern to successively scan said circular array over 360° so that said first ends are successively exposed to the light beam in a cyclical manner, said given distance corresponding to the distance light travels in any one of said optical fibers in a time increment equal to the time said beam takes to scan from one of said optical fibers to the next adjacent optical fiber in said arcuate segment whereby light passes from said light exit ends of the fibers making up said arcuate segment substantially simultaneously.

4. An annular scanning light pulse system according to claim 3, in which said light beam source comprises a laser and said scanning means includes an optical device on the optical axis of said laser for deflecting the light beam to form an acute angle with said optical axis; and means acting on said optical device to cause said beam to revolve about said optical axis at high speeds.

5. An annular scanning light pulse system according to claim 4, in which said optical device comprises a mirror and said means acting on said device is a motor for rotating said mirror about the optical axis, the normal to the surface of said mirror defining one half said acute angle with the optical axis of said laser.

6. An annular scanning light pulse system according to claim 5, in which there are provided a given number of arcuate segments each including said given number of optical fibers, the successive optical fibers in each segment being respectively connected together so that the output of said annular array comprises a series of light pulses each cycle corresponding to said given number of segments.

7. An annular scanning light pulse system according to claim 6, including light collecting and converging means positioned to intercept the light emanating from the exit ends of said fibers making up said segments to cause the same to converge to a given focal point so that a high intensity light pulse occurs at said focal point when light emanates from each of said segments.

* * * * *